(12) United States Patent
Agrawal et al.

(10) Patent No.: US 8,925,109 B2
(45) Date of Patent: Dec. 30, 2014

(54) CLIENT-SIDE PLAYER FILE AND CONTENT LICENSE VERIFICATION

(75) Inventors: Sunil C. Agrawal, Milpitas, CA (US); Roderick David Schultz, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 419 days.

(21) Appl. No.: 12/876,091

(22) Filed: Sep. 3, 2010

(65) Prior Publication Data
US 2013/0166909 A1  Jun. 27, 2013

Related U.S. Application Data

(63) Continuation-in-part of application No. 12/847,649, filed on Jul. 30, 2010.

(51) Int. Cl.
H04L 29/06 (2006.01)

(52) U.S. Cl.
USPC .......................................................... 726/29

(58) Field of Classification Search
CPC ... G06F 21/10; G06F 21/62; H04L 2209/603; H04L 9/0643
USPC .......................................................... 726/29
See application file for complete search history.

(56) References Cited

U.S. PATENT DOCUMENTS

| | | | |
|---|---|---|---|
| 6,009,176 A * | 12/1999 | Gennaro et al. | 713/170 |
| 6,189,146 B1 * | 2/2001 | Misra et al. | 717/177 |
| 6,772,340 B1 * | 8/2004 | Peinado et al. | 713/168 |
| 7,158,641 B2 * | 1/2007 | Hori et al. | 380/277 |
| 7,213,148 B2 * | 5/2007 | Anand | 713/168 |
| 7,225,335 B2 * | 5/2007 | Sato | 713/164 |
| 7,299,355 B2 * | 11/2007 | Qi | 713/168 |
| 7,389,273 B2 * | 6/2008 | Irwin et al. | 705/59 |
| 7,480,701 B2 * | 1/2009 | Smith et al. | 709/217 |
| 7,505,605 B2 | 3/2009 | Rhoads et al. | |
| 7,533,114 B2 * | 5/2009 | Neil et al. | 1/1 |
| 7,571,488 B2 * | 8/2009 | Oho et al. | 726/27 |
| 7,634,447 B2 * | 12/2009 | Kim et al. | 705/51 |
| 7,640,181 B2 | 12/2009 | McClure et al. | |
| 7,676,042 B2 * | 3/2010 | Okamoto et al. | 380/278 |
| 7,698,559 B1 | 4/2010 | Chaudhury et al. | |
| 7,702,107 B1 | 4/2010 | Messing | |

(Continued)

OTHER PUBLICATIONS

AES-hash; Bram Cohen & Ben Laurie; May 2, 2001.*

(Continued)

*Primary Examiner* — Luu Pham
*Assistant Examiner* — James Turchen
(74) *Attorney, Agent, or Firm* — Wolfe-SBMC

(57) ABSTRACT

Methods, systems, and apparatus, including computer programs encoded on a computer storage medium, for verifying a message based on application of a hashing algorithm. In one aspect, a method includes obtaining a license, from a remote server, for a content item to be presented using a player file executed by a multimedia player on a computing device. The license includes an encryption key and an authorization to present the content item using one or more authorized player files. A particular player file is received for use in presenting the content item, and a determination is made whether the particular player file is authorized for use in presenting the content item based on the authorization. The content item is decrypted using the encryption key, and the content item is presented using the particular player file in accordance with the determination.

23 Claims, 5 Drawing Sheets

(56) References Cited

U.S. PATENT DOCUMENTS

| | | | |
|---|---|---|---|
| 7,711,647 B2* | 5/2010 | Gunaseelan et al. | 705/59 |
| 7,735,144 B2 | 6/2010 | Pravetz et al. | |
| 7,765,601 B2* | 7/2010 | Sukigara et al. | 726/27 |
| 7,844,835 B2 | 11/2010 | Ginter et al. | |
| 7,913,314 B2 | 3/2011 | Orthlieb et al. | |
| 7,917,749 B2 | 3/2011 | Ginter et al. | |
| 7,984,463 B2* | 7/2011 | DePrez et al. | 725/25 |
| 8,140,437 B2* | 3/2012 | Kim et al. | 705/51 |
| 8,566,873 B2* | 10/2013 | Sie et al. | 725/41 |
| 2007/0233602 A1* | 10/2007 | Zweig et al. | 705/51 |
| 2007/0245159 A1* | 10/2007 | Youn | 713/187 |
| 2008/0063043 A1* | 3/2008 | Xia et al. | 375/233 |
| 2008/0109552 A1* | 5/2008 | Tamir et al. | 709/229 |
| 2009/0007092 A1* | 1/2009 | Wolfe | 717/173 |
| 2009/0086964 A1* | 4/2009 | Agrawal et al. | 380/44 |
| 2009/0249222 A1* | 10/2009 | Schmidt et al. | 715/751 |
| 2010/0111292 A1* | 5/2010 | Betouin et al. | 380/28 |
| 2010/0138744 A1* | 6/2010 | Kamay et al. | 715/716 |
| 2010/0257611 A1* | 10/2010 | Van Den Heuvel | 726/26 |
| 2010/0278345 A1* | 11/2010 | Alsina et al. | 380/283 |

OTHER PUBLICATIONS

Secure Scalable Streaming for Integrity Verification of Media Data; Hyoungshick Kim; Feb. 12-14, 2007; ICACT2007.*

Video Streaming Security: Window-Based Hash Chain Signature Combines With Redundancy Code; Emad Abd-Elrahman et al.; 2010 IEEE International Symposium on Multimedia; 2010.*

* cited by examiner

CLIENT-SIDE PLAYER FILE AND CONTENT LICENSE VERIFICATION

CROSS-REFERENCE TO RELATED APPLICATIONS

This application is a continuation-in-part application of, and claims priority to, U.S. patent application Ser. No. 12/847,649, entitled "Verifying Authenticity of Input Using a Hashing Algorithm," to inventor Roderick Schultz, which was filed on Jul. 30, 2010. The disclosure of the foregoing application is incorporated herein by reference in its entirety.

TECHNICAL FIELD

This specification relates to verifying the authenticity of a player file and confirming a content license using a client-side verification.

BACKGROUND

Hashing algorithms can be used to create a "fingerprint" of a file or other data input. Hash functions can be used to create a hash value that can serve as an identifier of a file or other data. The hash value can be used as a shortcut for a lookup table or can be used for data comparison, e.g., to detect duplicate data or to verify that a particular file is an authentic copy of another file. In some cases, hash functions for different files can map to the same hash value, which results in a collision. Typically, it is desirable to minimize such collisions, so hash functions that have relatively high collision-resistance are generally preferable over less collision-resistant hash functions. It is typically also desirable that a hash function is resistant to creation of alternative messages that produce the same hash value. Examples of hashing algorithms include MD4 (message digest algorithm 4), MD5, SHA-1, and RIPEMD.

Hash functions can be used to verify the authenticity of a player file that is used to present content on a client device. For example, an Adobe® Flash® Media Server can be used to verify client small web format (SWF) files before allowing the SWF files to connect to an application on the server for presenting content. Verifying SWF files can help prevent third parties from creating unauthorized SWF files designed to stream resources developed or published by another entity. When a client SWF file connects to the server, the server can verify the SWF files using a symmetric key shared between the client and the server. If verified, the SWF file is allowed to connect to the server-side application.

SUMMARY

This specification describes technologies relating to verifying player files on a client device using approved player device identifiers that accompany encryption keys used to decrypt content played using the player file. In some embodiments, the player file can be verified using hashing algorithms in which the operations performed during execution of the hashing algorithm are modified based on an input key.

In general, one innovative aspect of the subject matter described in this specification can be embodied in methods that include the actions of obtaining, from a remote server, a license for a content item to be presented using a player file executed on a computing device by a multimedia player. The license includes an encryption key and an authorization to present the content item using one or more authorized player files. A particular player file is received for use in presenting the content item, and a determination is made whether the particular player file is authorized for use in presenting the content item based on the authorization. The content item is decrypted using the encryption key, and the content item is presented using the particular player file in accordance with the determination. Other embodiments of this aspect include corresponding systems, apparatus, and computer programs, configured to perform the actions of the methods, encoded on computer storage devices.

These and other embodiments can each optionally include one or more of the following features. A source of the license is authenticated. The multimedia player is authenticated. The authorization to present the content item using one or more authorized player files includes a digital certificate associated with the particular player file and/or an identification of a source of the particular player file. The content item is presented using the particular player file in accordance with the determination by declining to present the content item if the particular player file is determined to not be authorized for use in presenting the content item based on the authorization. A portion of the content item is presented before making the determination and presenting the content item using the particular player file in accordance with the determination includes stopping the presentation of the content item if the particular player file is determined to not be authorized for use in presenting the content item based on the authorization. The determination whether the particular player file is authorized for use in presenting the content item is based on whether the determination is made within a predetermined time period. The determination is made by the multimedia player on the computing device. The authorization to present the content item using one or more authorized player files includes one or more predetermined hash values associated with the one or more authorized player files and making a determination whether the particular player file is authorized for use in presenting the content item based on the authorization includes computing one or more hash values using the particular player file, and comparing the one or more computed hash values with the one or more predetermined hash values. Computing one or more hash values using the particular player file includes using a plurality of nonlinear functions to generate the one or more hash values. Operations performed by the plurality of nonlinear functions are modified based on a key value. The license identifies a block size for blocks over which the hash values are computed and the one or more hash values are computed based on the blocks of the player file. Using a plurality of nonlinear functions to generate the one or more hash values includes identifying an input hash value and modifying the input hash value by iteratively applying at least a subset of the plurality of nonlinear functions to data from the particular player file. A plurality of nonlinear functions can be used to generate the one or more hash values by segmenting the particular player file into a plurality of blocks and modifying the input hash value by iteratively applying at least a subset of the plurality of nonlinear functions to blocks of the plurality of blocks. A plurality of nonlinear functions are used to generate the one or more hash values by modifying the input hash value and by iteratively applying a plurality of subsets of nonlinear functions to data from the particular player file in parallel to generate a plurality of parallel hash values and combining the parallel hash values to generate the output hash value. The operations performed by the plurality of nonlinear functions are modified based on the key value by determining an amount of rotation to be applied to data from the file based on the key value and/or selecting specific data for processing by the plurality of nonlinear functions based on the key value. The operations performed by the plurality of nonlinear functions include rotating data in the blocks and at least one of calculating a complement of data in the blocks or performing Boolean operations on data in the blocks.

In general, another aspect of the subject matter described in this specification can be embodied in methods that include the actions of receiving an identification of a content item for presenting audio or video on a user interface of a computing device and obtaining, from a remote server, a license for a content item to be presented using a player file. The license includes an encryption key associated with the content item and an authorization to present the content item using one or more authorized player files. An identification of a particular player file for use in presenting the content item is received. A determination that the particular player file is authorized for use in presenting the content item is made based on the authorization. The content item is decrypted using the encryption key, and the content item is presented using the particular player file in response to determining that the particular player file is authorized for use in presenting the content item. Other embodiments of this aspect include corresponding systems, apparatus, and computer programs, configured to perform the actions of the methods, encoded on computer storage devices.

These and other embodiments can each optionally include one or more of the following features. The particular player file includes a SWF file. A key value for use in verifying the particular player file is identified, the particular player file is segmented into a plurality of blocks, each of a plurality of predetermined nonlinear functions is modified based on the key value, and the plurality of modified nonlinear functions are applied to the plurality of blocks to generate an output hash value for use in determining that the particular player file is authorized for use in presenting the content item. The plurality of modified nonlinear functions are applied to the plurality of blocks in a plurality of iterations including one or more iterations and a final iteration. A buffer value is initialized to an initial hash value, and the buffer value is modified by combining a current buffer value with a result of an iteration of applying one or more modified nonlinear functions to one or more of the blocks to generate an updated buffer value, where the updated buffer value for each nonfinal iteration is used as a current buffer value for a subsequent iteration. The updated buffer value for each iteration is compared with a corresponding received predetermined hash value to determine that the particular player file is authorized for use in presenting the content item. Each of a second plurality of predetermined nonlinear functions is modified based on the key value, each of the second plurality of modified nonlinear functions is applied to the plurality of blocks to generate a second updated buffer value, and the updated buffer value for the final iteration is combined with the second updated buffer value to generate the output hash value. Modifying each of a plurality of predetermined nonlinear functions based on the key value includes at least one of determining an amount of rotation to be applied to blocks of data based on the key value or selecting specific data for processing by the plurality of nonlinear functions based on the key value.

In general, another aspect of the subject matter described in this specification can be embodied in systems that include one or more player file servers operable to deliver a player file to a remote computing device and one or more licensing servers. The player file identifies a content item to be presented by a media player on the remote computing device using the player file. The one or more licensing servers are operable to store licenses for content items to be presented using a player file executed by a multimedia player on the remote computing device. Each license includes an encryption key for use by the remote computing device to decrypt a corresponding content item and an authorization to present the content item using one or more authorized player files. The one or more licensing servers are further operable to transmit the licenses to the remote computing device for use by the remote computing device to determine whether a particular player file is authorized for use in presenting the content item based on the authorization, decrypt the content item using the encryption key, and present the content item using the particular player file based on a determination that the particular player file is authorized for use in presenting the content item.

These and other embodiments can each optionally include one or more of the following features. The authorization to present the content item using one or more authorized player files includes one or more predetermined hash values, with each predetermined hash value corresponding to one or more blocks of a player file. Each license further identifies a key value for use by the media player in generating one or more hash values, and the one or more hash values are generated by modifying each of a plurality of predetermined nonlinear functions based on the identified key value, and applying each of the plurality of modified nonlinear functions to segments of the particular player file. The particular player file is adapted for execution on a virtual machine player to present multimedia content. Modifying each of a plurality of predetermined nonlinear functions based on the key value includes at least one of determining an amount of rotation to be applied to segments of the particular player file based on the key value or selecting specific data from the particular player file for processing by the plurality of nonlinear functions based on the key value.

Particular embodiments of the subject matter described in this specification can be implemented so as to realize one or more of the following advantages. Player files can be verified at a client device as part of a process of verifying a license to content to be presented using the player file. The license verification process can include a key for decrypting the content and one or more hash values or other identifying information for confirming that the player file is authorized. The player file verification can be implemented using a non-standard, one way hashing algorithm that is resistant to cryptanalysis and is difficult to reverse engineer. The hashing algorithm or other player file verification processes can be used to verify the integrity of an Adobe® Flash® Player SWF file by preventing FLU and bandwidth theft and protecting the SWF file in case it is decompiled. Verifying SWF files prevents third parties from creating their own SWF files that attempt to stream another entity's resources. These techniques can also be used to protect a URL that streams video or other content presented using the SWF file. Requiring retrieval of an encryption key to access content can help ensure that the client device includes a valid multimedia player that also confirms whether the player file is authorized. The verification techniques can work with any type of content distribution. The techniques can protect against efforts to circumvent security measures, either through reverse engineering or intercepting keys needed to obtain access to content.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference symbols in the various drawings indicate like elements.

DETAILED DESCRIPTION

A client-side verification process can be used to verify a player file (e.g., a SWF file or another file that is used for presenting vector graphics, animations, or applets of varying degrees of interactivity and function) to protect against a threat of use of an unauthorized player file on a multimedia player (e.g., an Adobe® Flash® Player). An unauthorized player file can be used in some systems, for example, to stream or play back multimedia content without the authorization, remuneration, or other benefit to the content provider. The client-side verification process can use a hash algorithm or another verification technique to authenticate the player file. The verification technique can be supported as part of a process for obtaining and confirming a license necessary to view particular content to be presented using the player file. The license can be retrieved from a license server and can include an encryption key for use in decrypting the particular content and can include various permissions, including information identifying one or more player files that are authorized to present the particular content. The multimedia player on a client device can obtain the license and can allow playback of the content only if the player file that is attempting to playback the particular content is authorized to do so. Once the license, the content, and the player file are retrieved using a network connection, they can be stored on the client device for later use in presenting the content (e.g., in an offline mode, when a network connection to the license server and/or any other servers that are the source of the particular content or player files).

In some implementations, the information identifying authorized player files can use a hash algorithm to determine whether the player file is authorized. In particular, a hash algorithm can be applied to the player file itself to generate a hash that can be compared to an expected hash value for the player file to determine whether the player file is on the list of authorized player files. Although standard hash algorithms may provide an adequate degree of security for some applications, standard hash algorithms can be reverse engineered because an attacker may be able to model a static algorithm that can be used to create a hash value. Using a hash algorithm that modifies operations used in the algorithm based on an input key can reduce the threat of a hash algorithm being reverse engineered.

Figure 1:
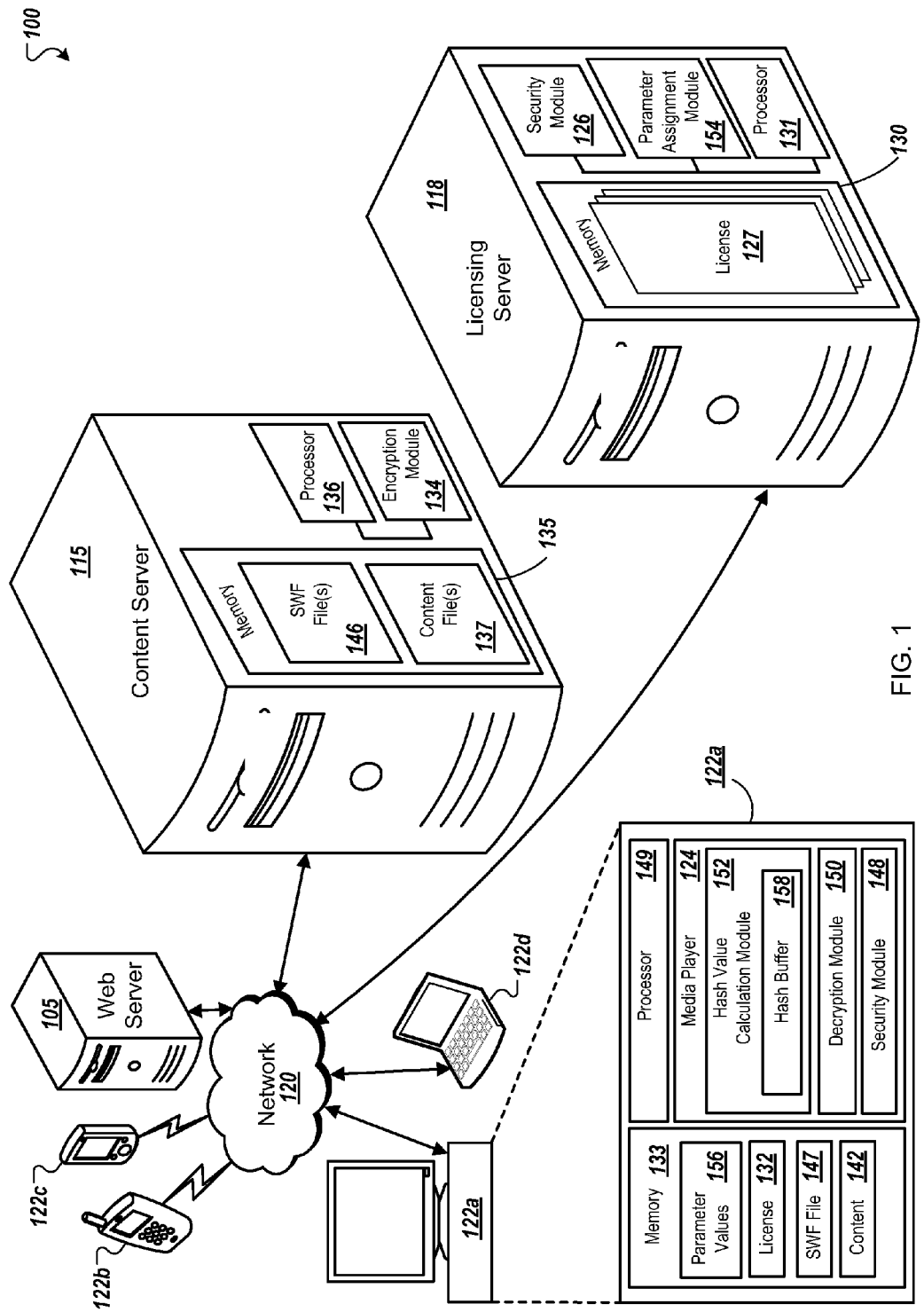
FIG. 1 is a block diagram illustrating a system for authorizing access to content.

FIG. 1 is a block diagram illustrating a system 100 for authorizing access to content. The system 100 includes one or more web servers 105, one or more content servers 115, and one or more licensing servers 118. Although only one of each of the servers 105, 115, and 118 is illustrated in FIG. 1 for convenience, the functionality of the servers 105, 115, and 118 can be distributed among multiple different servers. In addition, the functionality of the different servers 105, 115, and 118 can be implemented in one or more server pools. Throughout the following description, functions described as being performed on a server can be performed on a single server or on multiple servers acting in concert to perform the described functions. The web server 105, the content server 115, and the licensing server 118 can communicate through a network 120. The network 120 can include the Internet, one or more local area networks (LANs), one or more wireless networks, or any other network capable of facilitating electronic communications.

The web server 105, content server 115, and licensing server 118 can be accessed across the network 120 by client devices 122, e.g., personal computers 122a, mobile phones 122b, personal digital assistants (PDAs) 122c, laptop computers 122d or other remote devices capable of communicating across the network 120. For example, a user of the client device 122a may desire to view content (e.g., multimedia content) provided by the web server 105. For example, a user of the client device 122a may request a resource located on the web server 105. The user may, for example, enter or otherwise select (e.g., by clicking on a hyperlink) a URL (Uniform Resource Locator), corresponding to a resource located on the web server 105, into a web browser running on the client device 122a. Although client device 122a is used as an example, client devices 122b, 122c, and 122d may have a structure similar to 122a and may operate in a similar fashion and may be used in place of client device 122a.

In response to the request for the resource by the client device 122a, the web server 105 can send a copy of the resource to the client device 122a. In some implementations, the resource can indicate that one or more licenses 127 are needed to access (e.g., view or play) multimedia content corresponding to the resource. In response to receiving the resource with such an indication, the client device 122a can request a license for the multimedia content from the web server 105 or from the licensing server 118. In some implementations, the multimedia content corresponding to the resource can indicate that a license is needed to access the multimedia content. In such implementations, the client device 122a can request a license from the web server 105 or the licensing server 118 in response to receiving the multimedia content with such an indication or in response to the user attempting to access (e.g., view, play) the multimedia content. In some implementations, the web server 105 can forward a request for a license to the licensing server 118 in response to the request for the resource from the client device 122a.

The request for the license can be initiated by a media player application (e.g., an Adobe® Flash® Player application) 124 included in the client device 122a. The request for the license can include an identity of the media player application 124 or some other authorization information (e.g., a PKI (Public Key Infrastructure) key, or some other key) to be used by the licensing server 118 to verify the authenticity of the media player application 124 (e.g., so the licensing server 118 can confirm that the request originates with a media player application 124 that will only playback content after verifying the player file that is executed on the media player 124 to present the content). A security module 126 included in the licensing server 118 can validate that the license request is from an authentic media player application 124 and can digitally sign or otherwise authenticate a license 127 so that the client device 122a or the media player 124 can verify the license transmission and detect any tampering. The security module 126 can include software instructions stored in memory 130 (or in another storage area) that are executable by a processor 131 included in the licensing server 118. The license 127 can be generated in response to the license request or can be copied from the memory 130. The licensing server 118 can send the license 127 to the client device 122a. A copy of the license 127 can be stored as a license 132 in memory 133 of the client device 122a. As described in more detail below, the license 127 can include a content identifier, an encryption key, and an authorization to present the content.

The multimedia content referenced by the resource can be sent to the client device 122a, for example, concurrently with the sending of the license 127 or before or after the sending of the license. The multimedia content can be, for example, a file that is sent to the client device 122a, or the multimedia content can be content that is streamed to the client device 122a.

Multimedia content can be provided by the content server 115. Before sending the multimedia content, the content server 115 can encrypt the multimedia content using an encryption module 134. The encryption module 134 can include software instructions stored in memory 135 (or in another storage area) that are executable by a processor 136 included in the content server 115. The encryption module 134 can retrieve content from a content repository 137 included in the memory 135. Multimedia content can be sent to the client device 122a and can be stored as multimedia content 142 included in the memory 133 of the client device 122a.

The content server 115 or the web server 105 can provide one or more files used to present the multimedia content 142. For example, a player file can be provided that provides a runtime environment for presenting video, audio, text, and/or other information, which may be contained in a separate file. For example, in some implementations, the web server 105 can provide a SWF (Small Web Format) file, a Microsoft Silverlight file, or any other type of file. The operator of the web server 105 may desire that multimedia content provided by the web server 105 be viewed using a player file provided by the web server 105 or by the content server 115 and not some other player file. For example, the player file provided by the web server 105 or content server 115 can be configured to present advertisements, gather user behavior analytics, or perform other functionality beneficial to the provider of the web server 105. Moreover, control of the player file used to present multimedia content can prevent third parties from deriving an unauthorized benefit from proprietary or otherwise protected (e.g., copyrighted) content.

In response to the request for the resource by the client device 122a, the web server 105 can send a copy of a player file (e.g., SWF file) to the client device 122a. In some implementations, the player file can be provided by the content server 115. For example, the web server 105 can forward a request for the resource and/or the player file to the content server 115. The content server 115 can retrieve a player file from a player file repository (e.g., SWF files repository 146) included in memory 135 of the content server 115. The player file can be sent to the client device 122a before, concurrently with, or after the sending of the license 132. Similarly, the player file can be sent to the client device 122a before, concurrently with, or after the sending of the multimedia content 142. The client device 122a can store the player file 147 (e.g., SWF file) in the memory 133.

The license 132 can include a content identifier, an encryption key, and an authorization to present the multimedia content 142. Before processing the license 132, a security module 148 can verify a digital signature of the license 132. The security module 148 can include software instructions stored in memory 133 (or in another storage area) that are executable by a processor 149 included in the client device 122a. A decryption module 150 can identify the multimedia content 142 using the content identifier and can use the encryption key included in the license 132 to decrypt the multimedia content 142. The decryption module 150 can include software instructions stored in memory 133 (or in another storage area) that are executable by the processor 149.

The authorization to present the multimedia content 142 can include information to verify the SWF file 147. For example, the authorization information can include a white list which includes information relating to player files which are approved to present the multimedia content 142. For example, the white list can include, for each approved player file, information related to a PKI signature of the approved player file. The security module 148 can determine if the PKI signature of the SWF file 147 matches a PKI signature of an approved player file referenced in the white list.

As another example, in some implementations, the white list can include, for each approved player file, a URL of the approved player file. In such implementations, the media player 124 can confirm that the SWF file 147 was retrieved from the designated URL or can select and download an approved player file using the URL, e.g., using a secure connection. As yet another example, the white list can include hash information which can be used by a hash value calculation module 152 to verify the player file 147. The hash value calculation module 152 can include software instructions stored in memory 133 (or in another storage area) that are executable by the processor 149.

For example, the media player 124 can be configured to calculate a hash value or other fingerprint of the player file 147 and can compare the calculated hash value to hash information included in the license 132. The hash information can include an input key value that is used to calculate an output hash value. In some implementations, the hash information can also include an input hash value that is used as an initial hashing value to be modified by application of the hashing algorithm. For example, a parameter assignment module 154 included in the licensing server 118 can assign an input key value and an input hash value for inclusion in the hash information that is sent to the client device 122a. The parameter assignment module 154 can include software instructions stored in the memory 130 (or in another storage area) that are executable by the processor 131 included in the licensing server 118. These software instructions can, for example, select among various input key values and/or input hash values in a random manner or some other manner, which may appear random to outside observers. In some cases, the hash information can include the actual input key value and/or input hash value. In other cases, the hash information can include a pointer or other identifier for the assigned input key value and/or input hash value, the actual values of which can be predefined on the client device 122a.

The client device 122a can store the input key value, the input hash value, and other hash information in (or can select an identified input key value and/or input hash value from) a parameter values area 156 of memory 133 included in the client device 122a. The hash value calculation module 152 included in the media player application (e.g., an Adobe® Flash® player application) 124 calculates an output hash value for the player file 147 using the input key value and the input hash value. As described below, the output hash value can be generated through iterative modifications to the input hash value. Throughout these iterations, the input, intermediate, and output hash values can be stored in a hash buffer 158 included, for example, within the hash value calculation module 152.

The hash value calculation module 152 can calculate the output hash value using an algorithm that processes the player file 147 using multiple nonlinear functions, where the operations performed by the nonlinear functions are modified based on the key value. Using such an algorithm can make it difficult to reverse engineer the algorithm compared to a standard hash algorithm (e.g., an algorithm that includes logic that does not change based on an input key and/or that uses known processing steps). If a hash algorithm is reverse engineered or otherwise compromised, it may be possible for multimedia content provided by the web server 105 to be used without permission and/or without benefit to the provider of the web server 105. However, because the techniques implemented by the hash value calculation module 152 rely on non-standard processing operations that are not easily detected, the techniques are generally not susceptible to reverse engineering. In alternative embodiments, other hash algorithms can be used by the hash value calculation module 152.

The hash value calculation module 152 can compare the calculated hash value to an expected hash value included in the hash information. If the calculated hash value matches the expected hash value, the media player 124 can authenticate the player file 147. For example, the media player 124 can initiate the playback of the multimedia content 142 using the player file 147. The multimedia player 124 can, for example, be a virtual machine configured to execute player files.

In some implementations, playback of the multimedia content 142 can begin before the player file 147 is fully verified. In other words, a hash verification can be performed on portions, or blocks, of the player file 147 even as the player file 147 is used to begin playback of the content 142. The hash information included in the license 132 can include multiple expected hash values for an approved player file, such as an expected hash value for each of multiple blocks of the player file. For example, a block size can be defined as thirty two (32) kilobytes. As each block of the player file is input into the hash value calculation module 152, the hash value calculation module 152 can calculate a hash value of the block and can compare the calculated hash value to the respective associated expected hash value included in the license 132. If the calculated hash value for the received block matches the expected hash value, then playback of the multimedia content 142 can be allowed to continue. If the calculated hash value for the received block does not match the expected hash value, then playback of the multimedia content 142 can be halted.

Figure 2:
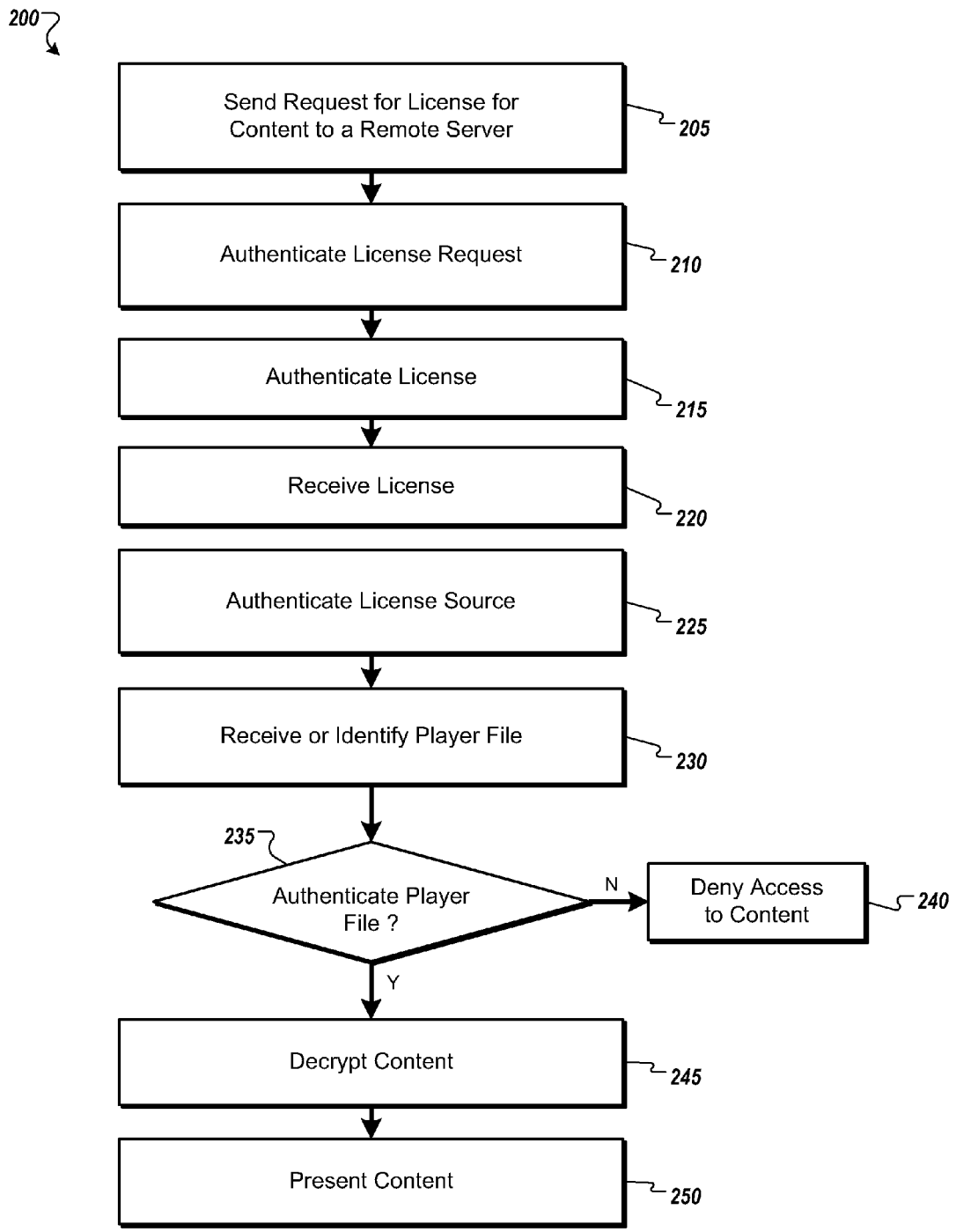
FIG. 2 is a flowchart illustrating a process for authorizing access to content.

FIG. 2 is a flowchart illustrating a process 200 for authorizing access to content. A request for a license for content is sent to a remote server at 205. For example, a user of a client device may wish to view multimedia content provided by a web server. The user of the client device may, for example, enter a URL of a resource (e.g., a web page) provided by a web server into a web browser running on the client device. The resource may include or refer to particular multimedia content. The resource or the content may indicate that a license is required to access the content. In response to receiving the resource or in response to attempting to access the content, the client device can send a request for a license to a web server or to a licensing server. In some implementations, the web server can forward the request for the license to the licensing server.

The license request can be sent by a media player, and an identification of the media player can be included in the license request. The media player may be, for example, a virtual machine that uses vector graphics and that executes a player file, other scripts, and/or rich Internet applications. An example media player is Adobe® Flash® Player. In general, a player file can run on the media player virtual machine and can reference content items (e.g., video and audio content) that are played on the virtual machine. The player file can define constraints on content and can provide other descriptions of how the content is presented. The player file can also define what additional information (e.g., advertisements, other content) is presented before, during, and after the content or what data is collected relating to content playback.

The license request is authenticated at 210. For example, the licensing server can authenticate the license request by verifying that the license request was sent by an authorized media player based on a PKI certificate or other information identifying the media player that sends the license request.

The license is authenticated at 215. For example, the licensing server can generate a license and can digitally sign the license for use in verifying the authenticity of the license message upon receipt at the client device. The license can include, for example, an encryption key and an authorization to present the content item using one or more authorized player files.

The license is received at 220. For example, the license can be sent from the licensing server to the client device. The license can be stored in memory of the client device.

The license source is authenticated at 225. For example, the client device can verify the digital signature of the license message to confirm that the license message originates from a valid source and that the license message has not been tampered with.

A player file is received or identified at 230. In some cases, the player file is received before requesting the license and is simply identified in memory of the client device as being the player file designated to present the particular content item. In other cases, the player file is retrieved after receiving the license. For example, the licensing server can initiate sending a player file to the client device in response to receiving the license request. As another example, a player file can be sent by the licensing server or by another server (e.g., a content server) to the client device in response to a user-initiated request for one or more resources (e.g., a web page, a content item, or the player file itself) sent from the client device. As yet another example, the license can include an identification of a source of a particular player file (e.g., a URL from which a player file can be obtained) and the client device can request the player file using the URL, and can receive the player file, such as over a secure connection.

It is determined whether the player file is authentic at 235. For example, if the license includes an identification of an approved source of a player file and if a known source of the player file matches the approved source, the media player can assume that a player file received from the source is authentic. As another example, the media player can verify a digital certificate associated with the received player file, e.g., using a digital certificate (e.g., PKI certificate) associated with the media player.

As another example, the media player can authenticate the player file by executing a hash algorithm with the player file as an input. The hash algorithm can use or reference hash information included in the license, obtained from another source, or previously stored on the client device. For example, hash information can include one or more predetermined hash values associated with one or more authorized player files, an identifier of the hash algorithm, a maximum time in which the verification is to be completed, and a block size over which each hash value is computed. The media player can compute one or more hash values using the player file and can compare the one or more computed hash values with the one or more predetermined hash values. If the one or more computed hash values match the one or more predetermined hash values, the media player can determine that the player file is authentic. If the one or more computed hash values do not match the one or more predetermined hash values, the media player can determine that the player file is not authentic.

As described in more detail below with respect to FIGS. 3 to 5, computing one or more hash values using the player file can include using one or more nonlinear functions to generate the one or more hash values. For example, operations performed by the one or more nonlinear functions can be modified based on a key value (e.g., a key value included in the license).

In some implementations, the license identifies a block size for blocks over which the hash values are computed. For example, one or more hash values can be computed based on each block of the player file. For example, for each block of the player file, a hash value may be computed and may be compared to a predetermined hash value included in the license and associated with that block. As another example, a hash comparison may be based on an iterative computation of successive hash values, where each subsequent hash value is dependent on the hash value that is output for the immediately preceding block (e.g., where the hash value that is output for the immediately preceding block is, in turn, based on hash values for all additional preceding blocks).

In some implementations, the hash algorithm includes identifying an input hash value and modifying the input hash value by iteratively applying at least a subset of the nonlinear functions to data from the player file. The player file may be segmented into two or more blocks and the input hash value may be modified by iteratively applying at least a subset of the one or more nonlinear functions to each of the blocks. In some implementations, the input hash value may be modified by iteratively applying one or more subsets of nonlinear functions to data from the particular player file in parallel to generate a multiple parallel hash values and combining the multiple parallel hash values to generate the output hash value.

In some implementations, the operations performed by the nonlinear functions are modified based on the key value by determining an amount of rotation to be applied to data from the file based on the key value, selecting specific data for processing by the plurality of nonlinear functions based on the key value, calculating a complement of data in the blocks, or performing Boolean operations on data in the blocks.

If the player file is not authenticated, access to content is denied at 240. For example, a request to access (e.g., view or play) content can be ignored, or an error message can be displayed by the media player in response to the request to access content.

If the player file is authenticated, content is decrypted at 245. For example, the media player can decrypt the content using an encryption key included in the license.

Content is presented at 250. For example, the media player can initiate the playback of the content using the authenticated player file. In some implementations, a portion of the content item can be presented before making a determination whether the player file is authorized for use in presenting the content. For example, playback of content can begin, and while content playback is occurring, an iterative process of authenticating portions of the player file can be performed, including verifying portion of the player file as portions of the player file are received. For example, as described above, blocks of the player file can be iteratively authenticated. In such a situation, the content is decrypted at 245 and presented at 250 before authentication of the player file is complete. Presentation of the content can be stopped, however, if one or more blocks of the player file are not authenticated, or if one or more of the blocks (or the entire file) is not validated or authenticated within a predetermined period (e.g., an upper time limit for completing the validation of one or more groups of the blocks or of all of the blocks). This security feature can prevent playback from continuing if the player file is not authenticated in a sufficiently timely manner.

Figure 3:
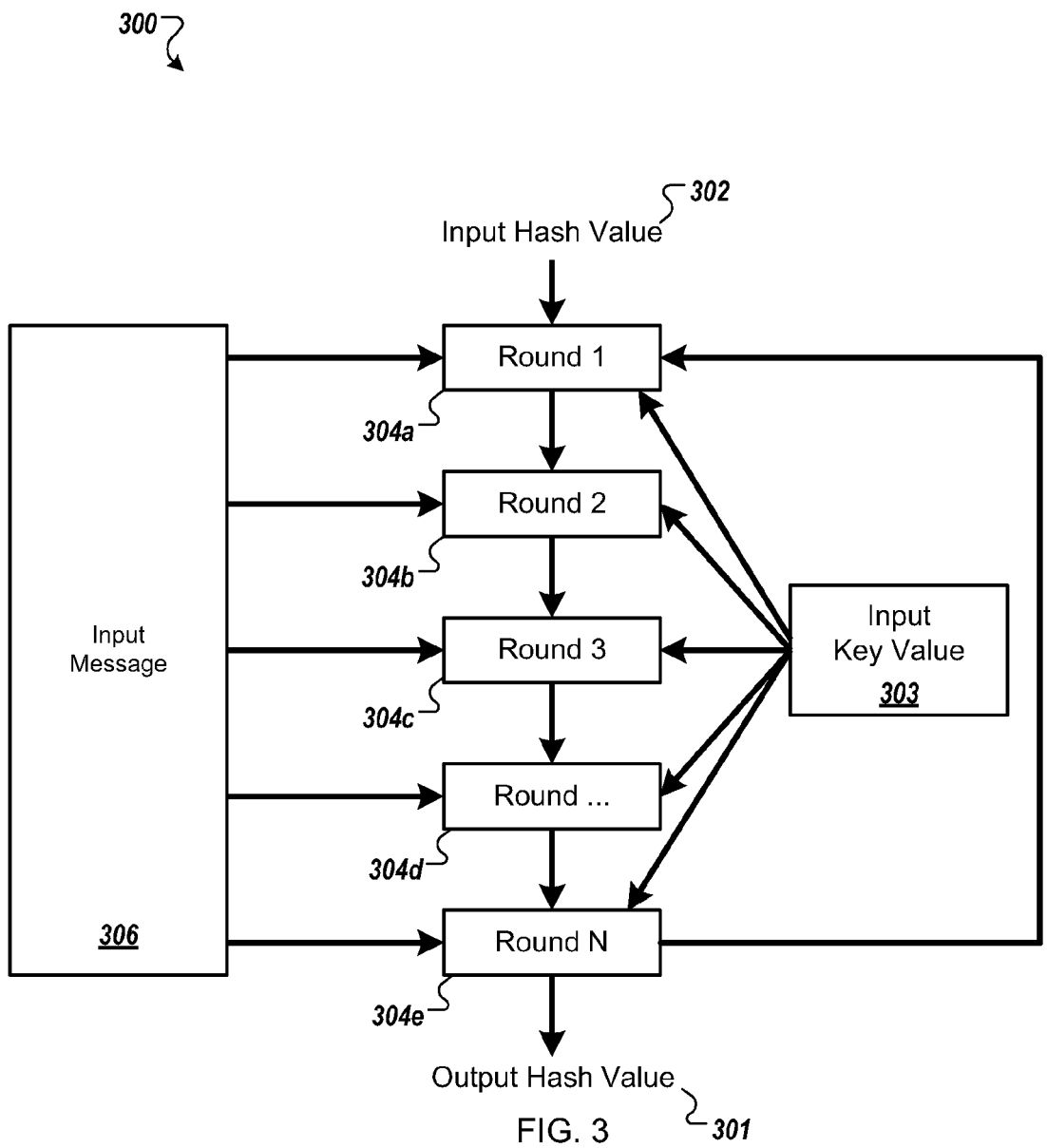
FIG. 3 is a block diagram illustrating an algorithm for calculating an output hash value.

FIG. 3 is a block diagram illustrating an algorithm 300 for calculating an output hash value 301. In the algorithm 300, an input hash value 302 and an input key value 303 are used by a set of processing rounds 304 to process an input message 306 to produce one or more output hash values 301. The input message 306 can be, for example, a file (e.g., a SWF file), a portion of a file (e.g., a portion of a SWF file), or some other data.

The input message 306 can be processed in segments. For example, the processing rounds 304 can process the input message in segments of a particular size (e.g., 512 bits). The input message 306 can be padded before being processed by the processing rounds 304, such that the size of the input message 306 is evenly divisible by a certain segment size (e.g., 512 bits). If the input message 306 is processed in segments, the algorithm 300 can include a repetition structure (e.g., a loop) which processes one segment of the input message 306 at a time. Within each loop iteration, a current segment can be identified and each of the processing rounds 304 can process the current segment. Alternatively, each loop iteration can operate on only a portion of the segment, such that multiple loops are performed for each segment.

The input hash value 302 can include an initial value that is copied to a hash buffer (e.g., hash buffer 158 in FIG. 1). Each processing round 304 can perform a plurality of nonlinear functions using some or all data from the hash buffer and some or all data from the current segment of the input message 306. The output of a particular processing round 304 can be stored in the hash buffer and the hash buffer can be used as input to a subsequent processing round 304. Nonlinear functions can include, for example, left rotation of data, bitwise Boolean operations (e.g., AND, OR, NOT, XOR (exclusive OR)), two's complement module $2^{32}$ addition, or other operations.

The operations performed by the plurality of nonlinear functions can be modified based on the input key value 303. For example, the number and type of operations performed by a processing round 304, the words selected for processing from the segment of the input message 306, and the words selected for processing from the hash buffer can be determined based on the input key value 303. For example, the amount of left rotation performed by some or all processing rounds 304 can vary based on the input key value 303. As a more particular example, if the input key value is, for example, "5", then the processing round 304a can perform, for example, a left rotation operation using a rotation amount of two bits, and if the input key value is, for example, "7", then processing round 304a can perform, for example, a left rotation operation using a rotation amount of three bits.

As another example, if the input key value is, for example, "A", then a particular processing round 304 can perform, for example, AND, NOT, and XOR Boolean operations but not OR Boolean operations on the current segment of the input message 306 and on the hash buffer and if the input key value is, for example, "H", then a particular processing round 304 can perform OR and NOT Boolean operations but not AND nor XOR operations on the current segment of the input message 306 and on the hash buffer.

Each processing round 304 can perform one or more nonlinear functions, or a variable number of nonlinear functions, where the number of nonlinear functions may vary based on the input key value 303. For example, in some implementations, each processing round 304 performs sixteen nonlinear functions. In some implementations, some or all of the nonlinear functions use the input key value as part of one or more operations. In addition to modifying the nonlinear functions based on the input key, the input key can also be selectively combined with the input message as in standard key-based hashing algorithms to alter the values that are input into the nonlinear functions.

The algorithm 300 can include a particular number of processing rounds 304 (e.g., two, three, five, ten, or any other number of processing rounds). In some implementations, the input message 306 (or a copy of the input message 306) is processed in parallel by multiple (e.g., two) sets of processing rounds 304. In such implementations, each set of processing rounds 304 can produce an output hash value 301, and a final output hash value 301 may be generated by combining (e.g., adding together) the output hash values 301 generated by each set of the multiple sets of processing rounds 304. One or more of the output hash values can be compared against predetermined hash values to perform intermediate authentications even before a final output hash value is produced after processing the entire player file.

Figure 4:
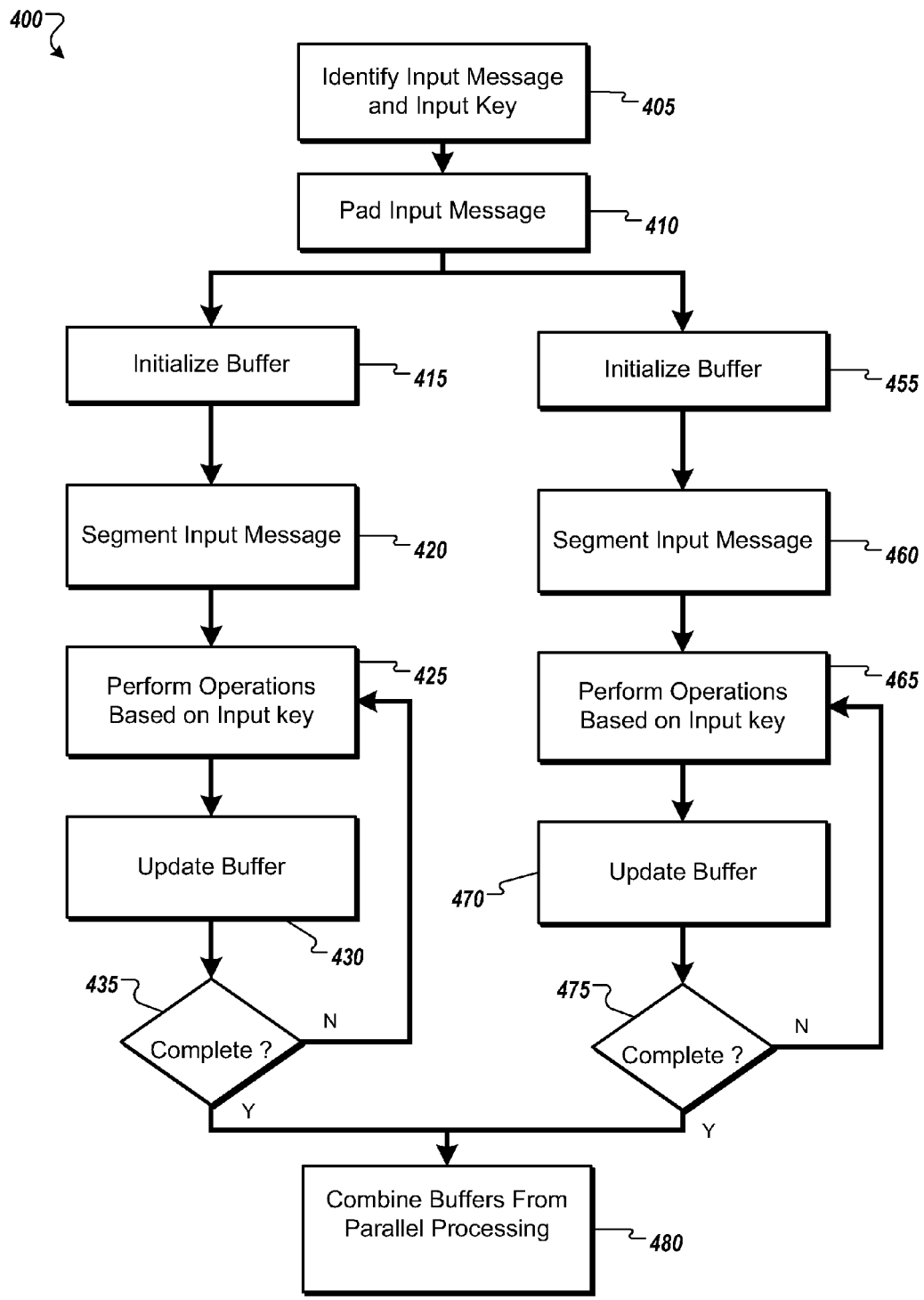
FIG. 4 is a flowchart illustrating a process for generating a hash value.

FIG. 4 is a flowchart illustrating a process 400 for generating a hash value. The process 400 can be performed, for example, by a server and/or by a client device and can incorporate the operations illustrated in FIG. 3, as further described below. An input message and input key are identified at 405. For example, a file or a portion of a file to be verified can be identified. As a more particular example, a SWF file or a portion of a SWF file used to present multimedia content can be identified. A client device, for example, can receive a SWF file to be verified from a server. If the input message is a portion of a SWF file, the process 400 can be performed on the portion of the SWF file and the process 400 can be repeated on unprocessed portions of the SWF file, until all portions of the SWF file have been processed. For example, the process 400 can be repeatedly performed on portions of the SWF file as portions of the SWF file are received.

In addition to identifying an input message, an input key value can be identified. For example, a client device can receive an input key value or an identification of an input key from a server. As another example, a server can select or generate an input key value to send to a client device and can store the input key sent to the client device for use in calculating an expected hash value in parallel with the client device's calculation of a hash value based on the input message and input key.

The input message is padded at 410. For example, the input message can be padded so that the length of the input message including the padding is evenly divisible by a certain size (e.g., 512 bits). As a more particular example, a first padding operation can be performed which results in the input message having a length of sixty four bits less than a multiple of 512 bits, and a second padding operation can be performed which adds a sixty four (64) bit length value to the padded input message, resulting in the input message including padding from both padding operations having a length evenly divisible by 512 bits.

In some implementations, the input message is processed using multiple (e.g., two) parallel processing paths, each of which operates on the same input data but which typically use entirely different or at least different combinations of nonlinear operations. In the example of FIG. 4, the first parallel path begins at 415 and a second parallel path begins at 455, where the path beginning at 455 includes similar processing to the path beginning at 415. In some alternative implementations, only one path is used, while other alternative implementations can use more than two parallel paths. At 415 (and similarly at 455), a buffer is initialized. For example, a buffer can be initialized to a pre-determined input hash value or set of values. As another example, the buffer can be initialized to a received value or set of values (e.g., a value or set of values received from a server). As a more particular example, the buffer can be a 160-bit buffer including five 32-bit words initialized to a series of hexadecimal values (where each value is a 32-bit word value), e.g.: 67452301, efcdab89, 98badcfe, 10325476, and c3d2e1f0. Other initial buffer values can also be used. At 455, a different, second buffer can be initialized. The second buffer can be initialized to the same value described above with respect to 415, or to a different value.

The input message is segmented at 420 (and similarly at 460). For example, the input message can be segmented into blocks of a particular size (e.g., 512 bits). The input message can be segmented into a block size based on the padding logic used in 410 above. For example, if the padding logic used in 410 above pads the input message to a size evenly divisible by a certain size (e.g., 512 bits), then the input message can be segmented into blocks of that size (e.g., 512 bits). A repetition structure can be configured to process segments of the input message. In some implementations, one repetition structure can include all parallel processing paths (e.g., the path beginning at 415, the path beginning at 455). In some implementations, each parallel processing path can be included in a different repetition structure.

The input message, or more specifically, a current segment of the input message, is processed using a plurality of non-linear functions at 425 (and similarly at 465), where the operations performed by the plurality of non-linear functions are modified based on the input key value. In some implementations, the buffer is also processed. For example, the number and type of operations performed and the words selected for processing from the segment of the input message and the words selected for processing from the buffer can be determined based on the input key value. For example, the amount of left rotation performed and particular Boolean operations selected to be performed can vary based on the input key value. Other types of operations can be performed, such as two's complement $2^{32}$ modulo addition of words. Generally, multiple different non-linear functions are used at 425 and a different set of non-linear functions is used at 465, although it is possible for some non-linear functions to be used more than once, either in the same parallel processing path or in different parallel processing paths. In some implementations, the operations performed at 425 and at 465 can use the techniques illustrated in and described in connection with FIG. 3.

In some implementations, operations are performed by a set of processing rounds, where the number of processing rounds can be predetermined (e.g., five) or variable (e.g., based on the input key value). Each processing round can perform a predetermined number (e.g., sixteen) or a variable number (e.g., based on the input key value) of operations.

The buffer is updated at 430 (and similarly at 470). For example, if the current buffer value is used as an input to the processing round, the output of a processing round can be stored in the buffer. As a more particular example, the output of each processing round statement can be stored in a particular word of the buffer. Alternatively, the output of a processing round can be combined with (e.g., added to) the current buffer value to produce a new buffer value that is used by a subsequent processing round and/or a subsequent iteration of the processing rounds to iteratively modify the buffer value. At any point in the process 400, the buffer value can be compared against predetermined hash values to authenticate or reject the player file.

At 435 (and similarly at 475), it is determined whether processing of the input message is complete. For example, it can be determined whether there are more segments to process. If there are more segments to process, operations are performed on the segment based on the input key value (at 425). If there are no more segments to process, buffers from parallel processing are combined at 480. For example, the buffer associated with each parallel processing path can be added together or otherwise combined to generate a final output hash value. In some implementations, e.g., where multiple input messages (e.g., corresponding to different blocks and/or combinations of blocks from the player file) are used, the buffer values can be combined multiple times during processing of the overall player file.

Figure 5:
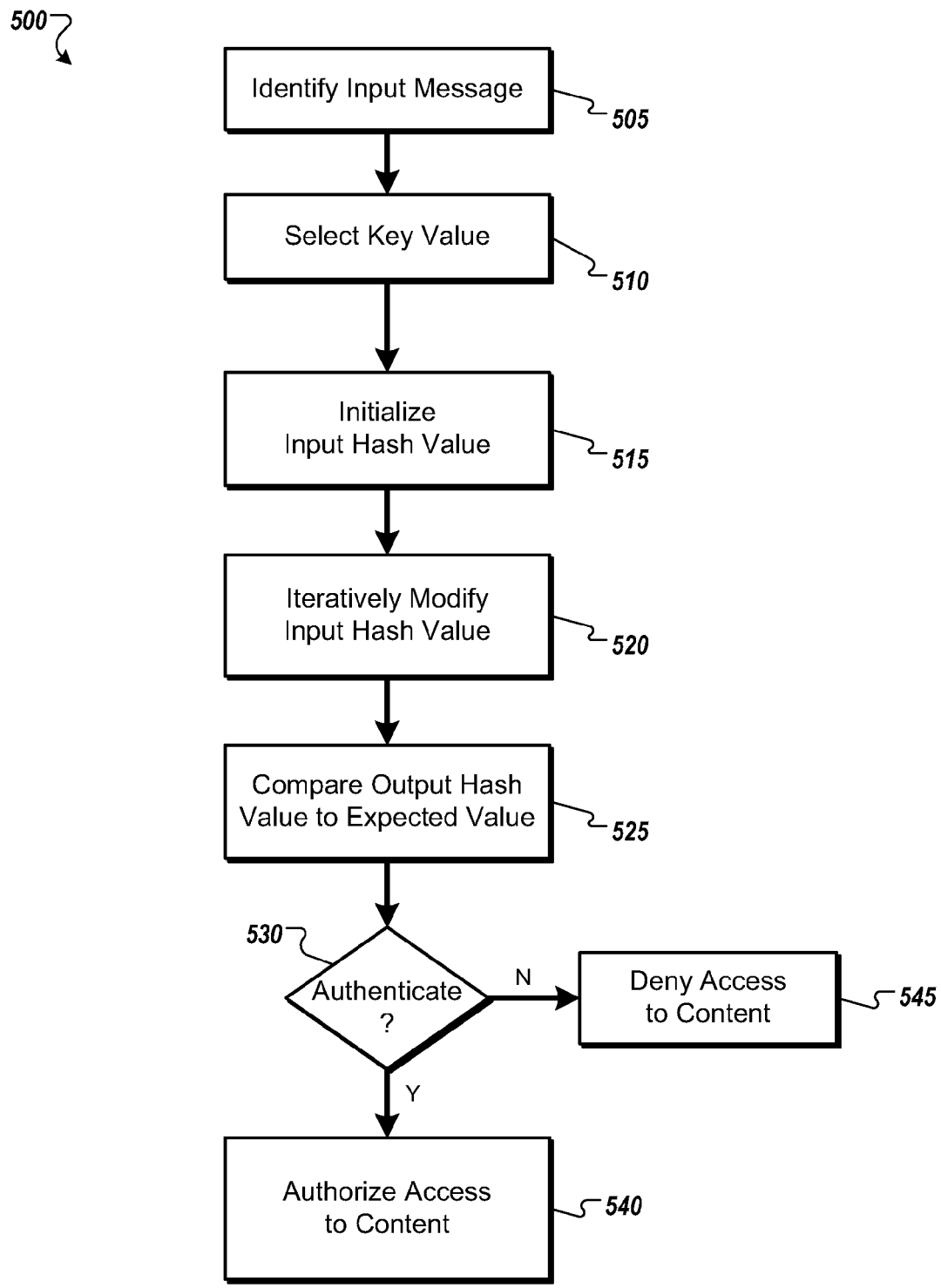
FIG. 5 is a flowchart illustrating a process for authorizing access to content.

FIG. 5 is a flowchart illustrating a process 500 for authorizing access to content. An input message is identified at 505. For example, a file to be verified can be identified. As a more particular example, a SWF file sent to a client device used to present multimedia content on the client device can be identified.

A key value is selected at 510. For example, a key value can be generated randomly, can be based on the current date and time, can be based on the input message, or can be based on a file (e.g., a multimedia content file) or on other data associated with the input message.

An input hash value is initialized at 515. For example, an input hash value can be initialized to a pre-determined value or set of values. As another example, the input hash value can be initialized to a 160-bit value including five 32-bit words initialized to the following hexadecimal values (where each value is a 32-bit word value): 67452301, efcdab89, 98badcfe, 10325476, and c3d2e1f0.

The input hash value is iteratively modified at 520. For example, at least a subset of a plurality of nonlinear functions can be iteratively applied to each of a plurality of blocks of the input message and to the input hash value. The operations performed by the plurality of nonlinear functions can include, for example, some or all of rotating data, calculating a complement of data, or performing Boolean operations. As another example, the input hash value can be modified by iteratively applying a plurality of subsets of nonlinear functions to data from the input message and to the input hash value in parallel to generate a plurality of parallel hash values. The plurality of parallel hash values can be combined to generate an output hash value. The nonlinear functions can be modified based on the input key value, for example, by determining an amount of rotation to be applied based on the input key value and/or by selecting specific data for processing by the plurality of nonlinear functions based on the input key value.

A buffer can be initialized to the input hash value and the plurality of modified nonlinear functions can be applied to the plurality of blocks and to the buffer in a plurality of iterations including one or more nonfinal iterations and a final iteration. The buffer can be modified by combining a current buffer value with a result of an iteration of applying one or more modified nonlinear functions to one or more of the blocks to generate an updated buffer value. The updated buffer value for each nonfinal iteration can be used as a current buffer value for a subsequent iteration. The updated buffer value for the final iteration can be used to generate an output hash value.

The output hash value is compared to an expected value at 525. For example, the generated output hash value can be compared to a second output hash value received from a client device.

A determination of whether to authenticate the input message is made at 530. For example, if the output hash value is equal to the expected value, access to content associated with the input message is authorized at 540. For example, if the input message is a SWF file used to present multimedia content, access to requested multimedia content can be authorized based on a match between the output hash value and the expected hash value. More particularly, as one example, requested multimedia content can be sent to a client device. As another example, a message can be sent to a client device authorizing playback of multimedia content previously sent to the client device.

If the output hash value is not equal to the expected value, access to content is denied at 545. For example, a request for multimedia content from a client device can be ignored. As another example, an error message can be sent to the client device.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous. In other alternative embodiments, the described techniques can be used to generate numerical values, and those numerical values can be used to perform authentication (e.g., authenticating someone by their ability to perform an action) or the resultant numerical values can be used as the input to another function (e.g., as a key for XORing data together).

What is claimed is:

1. A method performed by data processing apparatus, the method comprising:
obtaining a license, from a remote server, for a content item to be presented using a player file executed by a virtual machine multimedia player on a computing device, the license including an encryption key and an authorization to present the content item using one or more authorized player files that include one or more predetermined hash values;
receiving the player file for use in presenting the content item;
making a determination whether the player file is authorized for use in presenting the content item based on the authorization, said making the determination includes:
computing one or more hash values using the player file, said computing includes using a plurality of nonlinear functions to generate the one or more hash values, and operations performed by the plurality of nonlinear functions are modified based on a key value that is selected based on the player file;
identifying an input hash value;
modifying the input hash value by iteratively applying a plurality of subsets of the nonlinear functions to data from the player file in parallel to generate a plurality of parallel hash values;
combining the parallel hash values to generate an output hash value;
comparing the one or more computed hash values with the one or more predetermined hash values;
in response to a match being determined based on the comparison, authorizing the player file to present the content item;
decrypting the content item using the encryption key; and
presenting the content item using the player file executing on the virtual machine multimedia player in accordance with the determination.

2. The method of claim 1 further comprising authenticating a source of the license.

3. The method of claim 1 further comprising authenticating the virtual machine multimedia player.

4. The method of claim 1 wherein the authorization to present the content item using the one or more authorized player files includes at least one of a digital certificate associated with the player file or an identification of a source of the player file.

5. The method of claim 1 wherein presenting the content item using the player file in accordance with the determination includes declining to present the content item if the player file is determined to not be authorized for use in presenting the content item based on the authorization.

6. The method of claim 1 wherein a portion of the content item is presented before making the determination and presenting the content item using the player file in accordance with the determination includes stopping the presentation of the content item if the player file is determined to not be authorized for use in presenting the content item based on the authorization.

7. The method of claim 6 wherein making the determination whether the player file is authorized for use in presenting the content item is based on whether the determination is made within a predetermined time period.

8. The method of claim 1 wherein the determination is made by the virtual machine multimedia player on the computing device.

9. The method of claim 1 wherein the authorization to present the content item using the one or more authorized player files includes the one or more predetermined hash values associated with the one or more authorized player files.

10. The method of claim 1 wherein the license identifies a block size for blocks over which the one or more hash values are computed and the one or more hash values are computed based on the blocks of the player file.

11. The method of claim 1, wherein said using the plurality of nonlinear functions to generate the one or more hash values includes:
segmenting the player file into a plurality of the blocks; and
modifying the input hash value by iteratively applying at least the subset of the plurality of nonlinear functions to the blocks of the plurality of blocks.

12. The method of claim 1 wherein the operations performed by the plurality of nonlinear functions are modified based on the key value by at least one of determining an amount of rotation to be applied to the data from the player file based on the key value or selecting specific data for processing by the plurality of nonlinear functions based on the key value.

13. The method of claim 12 wherein the operations performed by the plurality of nonlinear functions include rotating data in the blocks and at least one of calculating a complement of the data in the blocks or performing Boolean operations on the data in the blocks.

14. A non-transitory computer storage medium encoded with a computer program, the program comprising instructions that when executed by data processing apparatus cause the data processing apparatus to perform operations comprising:
receiving an identification of a content item for presenting at least one of audio or video on a user interface of a computing device;
obtaining a license, from a remote server, for the content item to be presented using a player file, the license including an encryption key associated with the content item and an authorization to present the content item using one or more authorized player files executable on a virtual machine multimedia player;
receiving an identification of the player file for use in presenting the content item;
identifying a key value for use in verifying the player file, the key value being identified based on the player file;
segmenting the player file into a plurality of blocks;
modifying each of a plurality of predetermined nonlinear functions based on the key value;
applying each of the plurality of modified nonlinear functions to the plurality of blocks to generate an output hash value for use in determining that the player file is authorized for use in presenting the content item;
initializing a buffer value to an initial hash value;
modifying the buffer value by combining a current buffer value with a result of an iteration of applying one or more modified nonlinear functions to one or more of the blocks to generate an updated buffer value, the updated buffer value for each non-final iteration being used as a current buffer value for a subsequent iteration, the updated buffer value for each iteration compared with a corresponding received predetermined hash value to determine that the player file is authorized for use in presenting the content item;

determining that the player file is authorized for use in presenting the content item based on the authorization, the authorization determination including computing one or more of the hash values using the player file and comparing the one or more computed hash values with one or more predetermined hash values that are associated with the player file;

decrypting the content item using the encryption key; and presenting the content item using the player file in response to determining that the player file is authorized for use in presenting the content item.

15. The non-transitory computer storage medium of claim 14 wherein the player file includes a small web format (SWF) file.

16. The non-transitory computer storage medium of claim 15 wherein the plurality of modified nonlinear functions are applied to the plurality of blocks in a plurality of iterations including one or more iterations.

17. The non-transitory computer storage medium of claim 14 wherein the instructions cause the data processing apparatus to perform additional operations comprising:

modifying each of a second plurality of predetermined nonlinear functions based on the key value;

applying each of the second plurality of modified nonlinear functions to the plurality of blocks to generate a second updated buffer value; and combining the updated buffer value for the final iteration with the second updated buffer value to generate the output hash value.

18. The non-transitory computer storage medium of claim 14 wherein modifying each of the plurality of predetermined nonlinear functions based on the key value includes at least one of determining an amount of rotation to be applied to blocks of data based on the key value or selecting specific data for processing by the plurality of nonlinear functions based on the key value.

19. A system comprising:

one or more player file servers operable to deliver a player file to a remote computing device, the player file identifying a content item to be presented by a media player on the remote computing device using the player file;

executing one or more licensing servers on a processor of a computing device, the one or more licensing servers operable to:

store licenses for content items to be presented using the player file executed by the media player on the remote computing device, each license including an encryption key for use by the remote computing device to decrypt a corresponding content item and an authorization to present the content item using one or more authorized player files; and initiate transmission of the licenses to the remote computing device for use by the remote computing device to determine whether the player file is authorized for use in presenting the content item based on the authorization, decrypt the content item using the encryption key, and present the content item using the player file based on a determination that the player file is authorized for use in presenting the content item, the determination as to whether the remote computing device is authorized including to:

compute one or more hash values based on the player file using a plurality of nonlinear functions, and operations performed by the plurality of nonlinear functions are modified based on a key value that is selected based on the player file;

identify an input hash value;

modify the input hash value by iteratively applying subsets of the nonlinear functions to data from the player file in parallel to generate a plurality of parallel hash values;

combine the parallel hash values to generate an output hash value;

compare the one or more computed hash values with the one or more predetermined hash values; and in response to a match being determined based on the comparison, authorize the player file to present the content item.

20. The system of claim 19 wherein the authorization to present the content item using the one or more authorized player files includes the one or more predetermined hash values, with each predetermined hash value corresponding to one or more blocks of the player file.

21. The system of claim 19 wherein each license further identifies the key value for use by the media player to generate the one or more hash values, the media player configured to:

modify each of a plurality of predetermined nonlinear functions based on the identified key value; and apply each of the plurality of modified nonlinear functions to segments of the player file.

22. The system of claim 21 wherein the player file is adapted for execution on a virtual machine player to present multimedia content.

23. The system of claim 21 wherein modification of each of the plurality of predetermined nonlinear functions based on the key value includes at least one of an amount of rotation to be applied to segments of the player file determined based on the key value or specific data from the player file selected for processing by the plurality of nonlinear functions based on the key value.

* * * * *